INVENTOR
ROBERT L. SMITH

United States Patent Office 3,496,094
Patented Feb. 17, 1970

3,496,094
APPARATUS AND METHOD FOR RETORTING SOLIDS
Robert L. Smith, Western Springs, Ill., assignor, by mesne assignments, to The Oil Shale Corporation, New York, N.Y., a corporation of Nevada
Filed Nov. 24, 1967, Ser. No. 685,613
Int. Cl. C10b 1/10, 53/06
U.S. Cl. 208—11                                    16 Claims

ABSTRACT OF THE DISCLOSURE

Raw, solid material of an organic-mineral complex is mixed with hot solid material, e.g. spent oil shale, in a rotating kiln which can have baffles oriented to cause the solids to tumble and to urge the large particles near its outlet back from the outlet. Hydrocarbon vapors and fine retorted and spent solids pass from the kiln to cyclones which separate fines from vapors. The vapors are drawn off to further processing equipment, while the fines are mixed with oxygen-bearing gas and returned to the retorted solids heater. Hot spent solids from the heater can preheat the incoming oxygen-bearing gas, while exhausted combustion gas from the heater can preheat the solid organic-mineral complex material.

Figure 1:
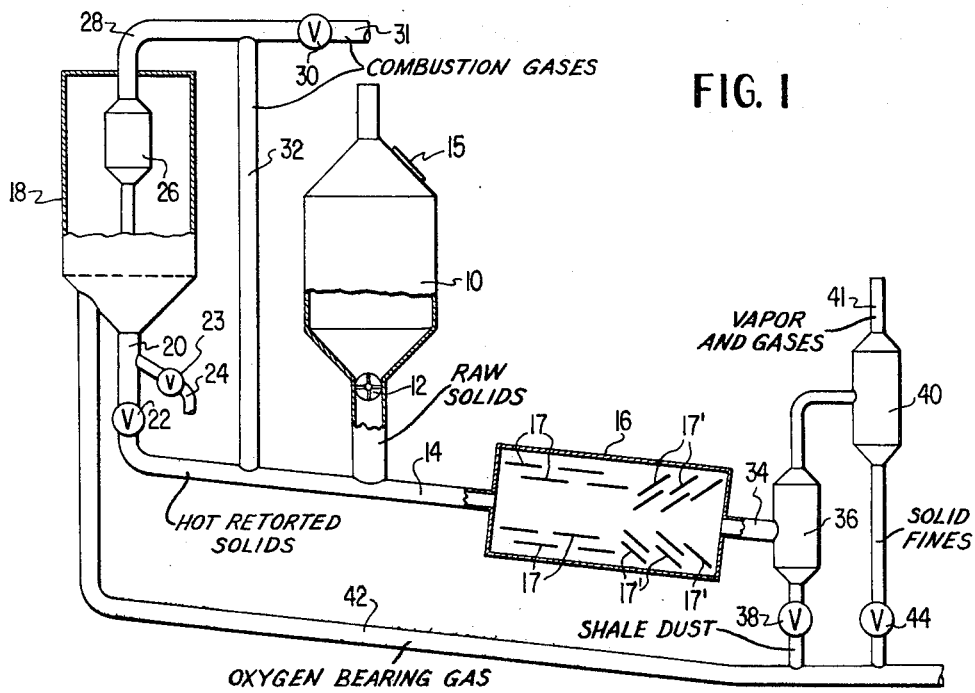

This invention pertains to apparatus for and a process of producing oil from solid organic-mineral complex material. In a specific embodiment, this invention pertains to apparatus for and a process of obtaining oil from oil shale.

Solid organic-mineral complex materials such as oil shale frequently contain hydrocarbons of value. These hydrocarbons can be recovered by subjecting the solid material to a treatment including heating and retorting. Many apparatus and processes have been proposed for recovering normally liquid hydrocarbon oils from such solid material. In one apparatus the solid material is passed through a back-mixed fluidized bed. In such apparatus some of the organic-mineral complex material is heated for too short a time to drive off the maximum amount of hydrocarbons obtainable. On the other hand, some of the released hydrocarbon is heated for so long a time that undue cracking of the hydrocarbons results.

Another apparatus presently used to derive oil from oil bearing solids utilizes a vertical retort in which the hydrocarbon bearing solids are fed into an area near the top of the retort where they are contacted with hot gas. The oil is driven off as a vapor and mist, and the retorted solids pass downward through the vessel. As the solids pass downward, they are further heated by gases passing upward through the bed of solids so that all of the oil is driven off. That oil which is driven from the solids below the uppermost portion of the retort must rise upward through the descending solids which are at a high temperature. As a consequence, the rising oil is subjected to excessive cracking during its ascent in the retort. Furthermore, near the top of the vertical retort the hydrocarbon vapors condense on the cold solids entering the retort, presenting problems of separation and increasing the likelihood of cracking, agglomeration, and clinkering.

In another type of apparatus for obtaining oil from organic-mineral complex solids, a heat transfer medium such as hot steel balls is utilized to heat the solids. Such a system requires that the heat transfer medium be separated from the spent solids after the oil has been driven off. Consequently, such a system requires elaborate apparatus for this separation.

The present invention is an apparatus for and a method of obtaining oil from solid organic-mineral complex material in which the derived oil has a short, relatively uniform residence time in the hot reaction zone, while the residence time of the solids is maintained at a level which insures that a high yield of oil is obtained. In addition, the oil is removed from contact with hot solids relatively soon after the organic-mineral complex is decomposed. As a consequence, the oil is not unduly cracked during the retorting process. Retorted solids are heated and the resulting spent solids are utilized as the heat transfer medium, thereby eliminating the need for a separate heat transfer material and eliminating the requirement for means to separate heat transfer material from retorted and spent solids. A further aspect of the present invention is the provision of a system for deriving oil from oil-bearing solids in which the heated waste products are used to preheat the input products, thereby increasing efficiency and eliminating problems of disposal of hot material.

Briefly, in the apparatus of the present invention the raw, solid organic-mineral complex material, such as oil shale, gibsonite, etc., can be passed from a hopper to a baffled rotary kiln in which the solids are mixed with hot spent solids to decompose the complex and drive off hydrocarbon vapors from the raw solid material. The hydrocarbon vapors pass from the kiln, through separation apparatus, to appropriate processing equipment such as fractionation or condensation equipment to provide the desired hydrocarbons which are preferably liquid at normal temperatures. The retorted solids and recycled spent solids are removed from the separation apparatus to a heating zone in which they are heated prior to return of at least a portion of them to the kiln. This heating serves to convert retorted solids into what I refer to as spent solids. Combustion gas from the solids heating zone is passed to the rotary kiln and utilized to lower the partial pressure of hydrocarbons made available on the solids as the result of the decomposition of the organic-mineral complex, thereby facilitating vaporization at lower temperatures. The gas also serves to remove the fine solids from the rotary kiln and to provide some incidental additional heat in the kiln. This combustion gas can also be employed to preheat the raw organic-mineral complex material; thus, heat is given up by this combustion gas prior to its being exhausted from the system. The remaining spent solids which are not utilized as heat transfer material in the kiln can be passed through a heat exchange zone in which they preheat the air which is to be utilized in the retorted solids heater. The spent solids thus give up a substantial portion of their heat prior to their passage from the system.

These and other aspects and advantages of the present invention are apparent in the following detailed description and claims, particularly when read in conjunction with the accompanying drawings in which like parts bear like reference numerals.

Figure 2:
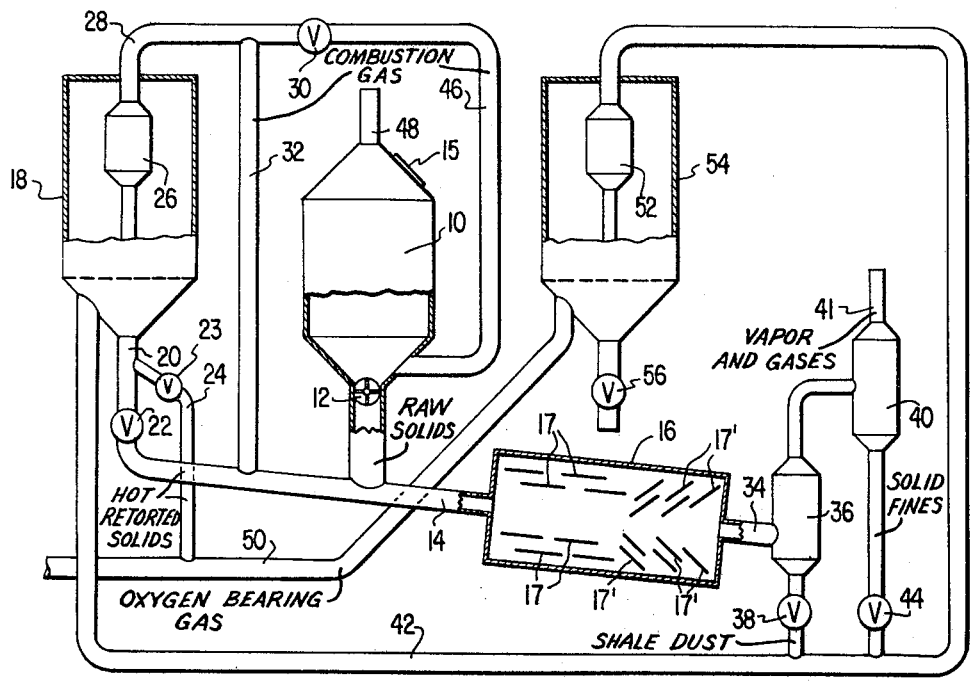

In the drawings:

FIGURE 1 is a diagrammatical representation of a first embodiment of the apparatus of the present invention; and FIGURE 2 is a diagrammatical representation of a second embodiment of the apparatus of the present invention.

As depicted in FIGURE 1, crushed, unscreened raw solid organic-mineral complex material, such as oil shale, passes from a storage or supply hopper 10 through a feed control mechanism such as star feeder 12 into feed line 14 through which it enters the inlet end of retort 16. The raw solids are loaded into hopper 10 through loading hole 15, as required. Retort 16 is a rotary kiln in the form of a rotating drum having baffles 17 and 17' extending over the length of the interior of kiln 16. Kiln 16 is inclined, with its outlet end lowered to aid the entry of solids into the kiln and to cause the solids to move toward the kiln outlet end.

Solid organic-mineral complex material from which normally liquid hydrocarbons have been removed, referred to as retorted solids or mineral dust, are heated along with recycled spent solids in burner or retorted solids heater 18 and then enter burner outlet pipe 20. Valve 22 permits a portion of the resulting hot spent solids to pass into kiln inlet pipe 14, while valve 23 passes the remainder into withdrawal pipe 24. Spent fines are separated from combustion gas by cyclone 26 within burner 18. The combustion gas passes out exhaust pipe 28. Valve 30 is controlled to direct a portion of the heated combustion gas into pipe 32 which passes it to kiln inlet pipe 14. The remainder of the combustion gas is exhausted through pipe 31. Valve 30 is controlled to introduce combustion gas into kiln 16 at a rate sufficient to lower the partial pressure of the hydrocarbons enough that hydrocarbons of the highest desired boiling point will vaporize at kiln temperature and be transported out before cracking appreciably and which helps carry the vapors and the retorted fines out of kiln 16. Essentially all the solids leave kiln 16 as fines in the hydrocarbon vapor-combustion gas stream. Baffles 17 cause the mixture of raw organic-mineral solids and spent solids to tumble as kiln 16 rotates. This results in thorough mixing of the raw solids and the hot spent solids, thereby insuring that the hot spent solids heat the raw solids. Baffles 17' near the kiln outlet are so arranged that, with the rotating motion of kiln 16, these baffles tend to move the larger particles near the kiln outlet upstream away from the kiln outlet, in addition to causing tumbling of the solids.

As the organic-mineral complex solids in kiln 16 are retorted, hydrocarbon vapors, combustion gas, and spent and retorted fine solids exit from kiln 16 via kiln outlet pipe 34 which passes the vapor, gas, and fines to cyclone 36. Thus, the residence time of the hydrocarbon vapors within the heat zone in kiln 16 is very short and nearly uniform. Consequently, little cracking of the hydrocarbon vapors takes place within kiln 16. Since baffles 17' move the larger solid particles away from the kiln outlet end, the residence time of these large particles within the heat zone of kiln 16 is increased to insure that most of the desired hydrocarbons are obtained from these larger particles. As the hydrocarbons near the outer surface of the larger solid particles are vaporized, the tumbling of the solids causes this outer surface to spall off so that new surface is exposed for decomposition of the organic-mineral complex and vaporization of the hydrocarbons. This spalling allows the hydrocarbon vapors to leave the solids more readily and permits heat to reach inner sections of the solids more rapidly. Consequently, particles of any size have residence times long enough effectively to recover essentially all their hydrocarbons. The tumbling also causes the solids within kiln 16 to fall through the combustion gas stream, thereby permitting ready escape of vapors and fines. The hydrocarbon partial pressure within kiln 16 is lower than atmospheric pressure, thereby aiding the evaporation of the hydrocarbons at moderately low temperatures and aiding the rapid removal of the hydrocarbons from kiln 16 before extensive cracking occurs. The hydrocarbon vapors and spalled-off fines quickly leave retort 16 in the vapor-gas flow.

Fine solids, e.g. shale dust, falls to the bottom of cyclone 36. Slide valve 38 permits control of the passage of the solids from the bottom of cyclone 36. The hydrocarbon vapors and combustion gas, together with some fine solid material, pass from the top of cyclone 36 to cyclone 40 which separates the solid fines from the vapors and gas. The hydrocarbon vapors and combustion gas pass from the top of cyclone 40 via output pipe 41 to other processing and utilizing equipment (not shown).

The passage of solid fines from the bottom of cyclone 40 into gas inlet pipe 42 is controlled by slide valve 44. An oxygen-bearing gas such as air is supplied through pipe 42 to burner 18 to carry the retorted and recycled spent solids to the burner and to support combustion within the burner. Preferably, within burner 18 the solids are in a dense phase fluidized bed. The residual carbonaceous material is burned from the retorted solids within burner 18 to heat these solids and recycled spent solids prior to their entry into burner outlet pipe 20.

FIGURE 2 depicts an embodiment of the retorting apparatus which makes maximum use of the heat within the spent solids and within the exhaust gases, thus increasing the system efficiency and lowering the temperature of the exhaust products. Crushed raw solids pass from hopper 10 through star feeder 12 to kiln inlet pipe 14 which introduces them to rotating kiln 16 which includes baffles 17 and 17'. Retorted and spent solids are heated in burner 18, and the hot spent solids pass through burner outlet pipe 20 and valve 22 to kiln inlet pipe 14. Combustion gases from burner 18 pass through cyclone 26 to exhaust pipe 28 where valve 30 diverts a portion of them through pipe 32 into kiln inlet pipe 14. Hydrocarbon vapor, combustion gas and retorted and spent fine solids leave kiln 16 via kiln outlet pipe 34 which passes them to cyclones 36 and 40. Slide valves 38 and 44 control passage of mineral dust from cyclones 36 and 40 to air inlet pipe 42 which provides hydrocarbon-bearing retorted solids, spent solids and air to burner 18. The hydrocarbon vapors and combustion gas leave cyclone 40 via output pipe 41.

Combustion gas from burner 18 which is not sent to kiln inlet pipe 14 passes valve 30 to hopper inlet pipe 46 which introduces the hot combustion gas at the bottom of raw solids hopper 10. As this hot combustion gas passes through the raw solids within hopper 10, the solids are preheated before being introduced into kiln 16, and the combustion gas loses a substantial portion of its heat so that when it is exhausted from the system at hood and stack 48 it is at a substantially lower temperature. In addition, fines within the combustion gas are filtered out by the raw solids, thus reducing air contamination.

Oxygen bearing gas such as cold air is supplied to the system via pipe 50. Valve 23 controls flow of hot spent solids from burner outlet pipe 20 to pipe 24 which passes them to pipe 50. During passage of the cold air and the hot spent solids through pipe 50, the hot solids heat the air. The preheated air and the substantially cooled solids are separated by cyclone 52 within separator 54. Slide valve 56 permits control of the discarding of these spent solids from the bottom of separator 54. The preheated air passes through cyclone 52 to air inlet pipe 42.

The embodiment of FIGURE 2 thus utilizes the heat within the exhaust gases to preheat the raw solids and uses the heat in the waste solids to preheat the incoming air. Consequently, the system efficiency is increased, and the exhaust products are considerably cooled before passage from the system, thereby simplifying their disposal. If desired, the hot spent solids in pipe 24 may be used to, e.g., generate steam in a boiler, before being further cooled by and preheating the cold air in pipe 50.

Cyclones 26 and 52 need not be highly efficient, since their outlets are coupled to other equipment containing spent solids. However, cyclones 36 and 40 are more highly efficient to keep fine solids from passing with the hydrocarbon vapors to the processing and utilizing equipment.

By way of example, apparatus of the form depicted in FIGURE 2 can be utilized to obtain hydrocarbon vapors from solid organic-mineral complex material, e.g. oil shale, fed from hopper 10 to kiln 16 at a rate of 90,000 pounds per hour. 150,000 pounds per hour of hot, spent shale are passed by valve 22 from burner 18 to kiln 16, and about 1,000 pounds per hour of combustion gas from burner 18 enter kiln 16 via pipes 32 and 14. 20,000 pounds of air per hour are mixed with 78,000 pounds per hour of hot spent shale within pipe 50. This spent shale is discarded from separator 54 through slide valve 56. The 20,000 pounds of preheated air pass through pipe 42 and bring 230,000 pounds of retorted solids and spent solids from cyclones 36 and 40 back to burner 18. About 21,000 pounds per hour of combustion gas are exhausted from stack 48, and about 10,000 pounds per hour of hydrocarbon vapor are obtained from cyclone 40.

The raw shale is preheated within hopper 10 to a temperature in the range of about 325° F. to 425° F. and preferably in the order of 375° F. The hot, spent solids and combustion gas entering kiln 16 from burner 18 are at a temperature in the range of about 1150° F. to 1275° F. and preferably in the order of 1250° F. As a result, the temperature within kiln 16 is relatively uniform in the range of about 825° F. to 950° F. and preferably at about 900° F. Spent solids from burner 18 pass into pipe 50 at a temperature in the range of about 1150° F. to 1275° F., and preferably at about 1200° F. Air enters pipe 50 at ambient temperature of about 100° F. and is preheated to a temperature in the range of about 850° F. to 950° F. and preferably of about 900° F. The combustion gas exhausted from stack 48 is at a temperature in the order of about 200° F., while the spent shale discarded from the bottom of separator 54 is at a temperature in the range of about 850° F. to 950° F. and preferably of about 900° F. Hydrocarbon fuel is required within burner 18 at a rate in the range from about 1500 to 1800 pounds per hour to insure heating of the spent solids to the proper level. If insufficient carbon is retained on the retorted solids, it may be desirable to provide additional hydrocarbon fuel to the burner, with the resulting combustion gas passing from the system via hopper 10 and stack 48.

Within kiln 16 the hydrocarbon vapors have a partial pressure of 0.5 to 0.75 atmosphere, and a residence time in the range of about one to six minutes with an average of about three minutes. This is short enough that these vapors are not cracked significantly within kiln 16.

Although the above description has been with reference to preferred embodiments and methods, numerous modifications and rearrangements might be made, and still the resulting apparatus and process would be within the scope of the invention.

What is claimed is:

1. Apparatus for deriving hydrocarbon vapors from solid organic-mineral complex material comprising:
    (a) retorting means comprising a rotating kiln with an inlet and an outlet;
    (b) first supply means for supplying solid organic-mineral complex material to said kiln inlet;
    (c) separating means for separating material discharged from said kiln into fine solid material and gaseous products;
    (d) burner means for heating said fine solid material, said burner means including separation means for separating heated spent solid material from combustion gases, said burner means further including outlet means for supplying heated spent solid material to said kiln;
    (e) second supply means for supplying said combustion gases to said kiln inlet; and
    (f) gas inlet means for supplying oxygen-bearing gas to said burner means.

2. Apparatus as claimed in claim 1 in which said kiln includes baffles on its interior surface oriented to cause solid particles to tumble.

3. Apparatus as claimed in claim 2 in which said kiln further includes baffles on its interior surface oriented to cause solid particles to move upstream from the kiln outlet.

4. Apparatus as claimed in claim 1 in which said gas inlet means couples said separating means to said burner inlet means to transport fine solid material from said separating means to said burner means.

5. Apparatus as claimed in claim 4 in which said kiln includes baffles on its interior surface oriented to cause solid particles to tumble.

6. Apparatus as claimed in claim 5 in which said kiln further includes baffles on its interior surface oriented to cause solid particles to move upstream from the kiln outlet.

7. Apparatus as claimed in claim 4 in which said burner means outlet means is coupled to said gas inlet means to mix heated spent solid material with the oxygen-bearing gas and in which said gas inlet means includes additional separation means for separating heated oxygen-bearing gas from spent solid material and further includes discard means connected to said additional separation means for discarding spent solid material.

8. Apparatus as claimed in claim 7 in which said separation means is coupled to said first supply means to pass a portion of the combustion gas through the solid organic-mineral complex material.

9. Apparatus as claimed in claim 8 in which said kiln includes baffles on its interior surface oriented to cause solid particles to tumble.

10. A process for deriving hydrocarbon vapors from solid organic-mineral complex material comprising:
    (a) supplying an oxygen-bearing gas to a burning zone;
    (b) heating mineral fines in said burning zone;
    (c) passing combustion gas from said burning zone to a zone for retorting said solids;
    (d) passing hot mineral fines from said burning zone to said retorting zone;
    (e) tumbling the solid organic-mineral complex material within said retorting zone to obtain hydrocarbon vapors and mineral fines from the solid organic-mineral complex material;
    (f) passing said combustion gas containing mineral fines and hydrocarbon vapors from said retorting zone;
    (g) separating said hydrocarbon vapors from said mineral fines; and
    (h) passing said mineral fines to said burning zone.

11. The process of claim 10 further comprising using said oxygen-bearing gas to convey said mineral fines to said burning zone.

12. The process of claim 10 further comprising passing said oxygen-bearing gas through hot mineral fines from said burning zone before supplying said gas to said burning zone.

13. The process of claim 12 further comprising passing combustion gas from said burning zone through said solid organic-mineral complex material before tumbling.

14. The process of claim 10 in which said solid organic-mineral complex material is oil shale.

15. Apparatus for deriving hydrocarbon vapors from solid organic-mineral complex material comprising:
    (a) retorting means comprising a rotating kiln with an inlet and an outlet and having on its interior surface first baffles oriented to cause solid particles to tumble and second baffles oriented to cause solid particles to move upstream from the kiln outlet;
    (b) first supply means for supplying solid organic-mineral complex material to said kiln inlet;
    (c) separating means for separating material discharged from said kiln into fine solid material and gaseous products;
    (d) burner means for heating said fine solid material, said burner means including separation means for separating heated spent solid material from combustion gases, said separation means coupled to said first supply means to pass a portion of the combustion gases through the solid organic-mineral complex material, said burner means further including outlet means for supplying heated spent solid material to said kiln;
    (e) second supply means for supplying said combustion gases to said kiln inlet; and
    (f) gas inlet means for supplying oxygen bearing gas to said burner means, said gas inlet means coupled to said burner means outlet to mix heated spent solid material with the oxygen-bearing gas, said gas inlet means including additional separation means for separating heated oxygen-bearing gas from spent solid material and discard means connected to said additional separation means for discarding spent solid material.

16. A process for deriving hydrocarbon vapors from solid organic-mineral complex material comprising:
(a) heating mineral fines in a burning zone;
(b) passing combustion gas from said burning zone to a retorting zone;
(c) supplying solid organic-mineral complex material to said retorting zone;
(d) passing hot mineral fines from said burning zone to said retorting zone;
(e) tumbling the solid organic-mineral complex material and the hot mineral fines within said retorting zone to obtain hydrocarbon vapors and mineral fines;
(f) passing said combustion gas containing mineral fines and hydrocarbon vapors from said retorting zone;
(g) separating said hydrocarbon vapors from said mineral fines;
(h) passing said mineral fines to said burning zone;
(i) mixing heated mineral fines from said burning zone with an oxygen-bearing gas to heat said oxygen-bearing gas;
(j) separating said heated oxygen-bearing gas from said hot mineral fines;
(k) discarding said separated hot mineral fines;
(l) supplying said heated oxygen-bearing gas to said burning zone; and
(m) passing combustion gas from said burning zone through said solid organic-mineral complex material prior to passage of said material to said retorting zone.

References Cited

UNITED STATES PATENTS

| | | | |
|---|---|---|---|
| 1,830,884 | 11/1931 | Nielsen et al. | 201—33 |
| 2,654,698 | 10/1953 | Phinney | 201—33 |
| 2,664,389 | 12/1953 | Rex et al. | 201—33 |
| 2,689,787 | 9/1954 | Ogorzaly et al. | 201—14 |
| 3,336,104 | 8/1967 | Miller | 208—11 |

HERBERT LEVINE, Primary Examiner

U.S. Cl. X.R.

23—284; 201—12; 202—100; 208—8